United States Patent
Feng et al.

(10) Patent No.: US 11,544,958 B2
(45) Date of Patent: Jan. 3, 2023

(54) LIGHT DETECTION APPARATUS AND APPLICATION THEREOF

(71) Applicant: SHANGHAI HARVEST INTELLIGENCE TECHNOLOGY CO., LTD., Shanghai (CN)

(72) Inventors: Sheng Feng, Shanghai (CN); Tianyang Wang, Shanghai (CN); Fengjun Gu, Shanghai (CN); Jiandong Huang, Shanghai (CN)

(73) Assignee: SHANGHAI HARVEST INTELLIGENCE TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 17/319,480

(22) Filed: May 13, 2021

(65) Prior Publication Data

US 2021/0264128 A1 Aug. 26, 2021

Related U.S. Application Data

(63) Continuation of application No. PCT/CN2019/117018, filed on Nov. 11, 2019.

(30) Foreign Application Priority Data

Nov. 13, 2018 (CN) .......................... 201811348929.8

(51) Int. Cl.
*G06V 40/13* (2022.01)
*G06F 3/042* (2006.01)
(Continued)

(52) U.S. Cl.
CPC .......... *G06V 40/1318* (2022.01); *G02B 5/285* (2013.01); *G06F 3/0412* (2013.01); *G06F 3/0416* (2013.01); *G06F 3/0421* (2013.01)

(58) Field of Classification Search
CPC .. G06V 40/1318; G02B 5/285; G06F 3/0412; G06F 3/0416; G06F 3/0421
See application file for complete search history.

(56) References Cited

U.S. PATENT DOCUMENTS

2002/0005473 A1* 1/2002 Lauxtermann ......... H04N 3/155
250/208.1
2017/0091506 A1 3/2017 Sinha et al.
(Continued)

FOREIGN PATENT DOCUMENTS

CN 107004130 A 8/2017
CN 107454963 A 12/2017

OTHER PUBLICATIONS

International Search Report for PCT/CN2019/117018 dated Feb. 14, 2020.

*Primary Examiner* — Stephen G Sherman
(74) *Attorney, Agent, or Firm* — Thomas | Horstemeyer, LLP

(57) ABSTRACT

The present disclosure provides a light detection apparatus and application thereof. The apparatus includes: a non-opaque cover plate, a display, and a photosensor, and further including a processor configured to transmit a display driving signal to the display when the apparatus detects a touch signal on the apparatus; wherein the display includes a plurality of display pixels configured to emit an optical signal when receiving the display driving signal transmitted by the processor, and the optical signal is reflected on an upper surface of the nonopaque cover plate to form a reflected optical signal; and wherein the reflected optical signal is received by the photosensor. By some embodiments of the present disclosure, obtained physiological feature information can be more accurate and identification precision can be effectively improved.

13 Claims, 4 Drawing Sheets

(51) Int. Cl.
*G02B 5/28* (2006.01)
*G06F 3/041* (2006.01)

(56) References Cited

U.S. PATENT DOCUMENTS

| | | |
|---|---|---|
| 2017/0220838 A1 | 8/2017 | He et al. |
| 2018/0025205 A1 | 1/2018 | Wu et al. |
| 2018/0074627 A1* | 3/2018 | Kong ................ G06V 40/1318 |
| 2018/0293452 A1 | 10/2018 | Chung et al. |
| 2018/0321428 A1* | 11/2018 | Jones ..................... G02B 5/285 |
| 2018/0365470 A1 | 12/2018 | Li et al. |

\* cited by examiner

LIGHT DETECTION APPARATUS AND APPLICATION THEREOF

CROSS-REFERENCE TO RELATED APPLICATIONS

This application is a continuation of International Application No. PCT/CN2019/117018, filed on Nov. 11, 2019, entitled "LIGHT DETECTION APPARATUS AND APPLICATION THEREOF," which claims the benefit of priority to Chinese Patent Application No. 201811348929.8, filed on Nov. 13, 2018, entitled "Light Detection Apparatus and Application Thereof," the entire disclosures of which are hereby incorporated herein by reference.

TECHNICAL FIELD

The present disclosure relates to the field of optical devices, and more particularly to a light detection apparatus and application thereof, and more particularly to a method for detecting a physiological feature using the light detection apparatus.

Nowadays, display panel technology, whether it is a liquid crystal display (LCD), an active array organic light-emitting diode display (AMOLED), or a micro light-emitting diode display (micro-LED), applies a thin film transistor (TFT) structure to scan and drive a single pixel, in order to achieve a display function of a pixel array on a screen of the display. If a light detection function is integrating with the display, due to factors such as a thickness of the display and an aperture of pixels, a real image sensed by a photo diode array has been distorted with diffraction. Further, an optical signal transmits through a multilayer structure of the display, and an optical display signal and a touch sensing signal coexist, it is very difficult to extract useful optical signals from a scene with a low signal-to-noise ratio, and the difficulty in technique is almost equivalent to single-photon imaging technology.

SUMMARY

The present disclosure provides a light detection apparatus, in order to resolve the problem that an intensity of the reflected optical signal entering the photosensor is severely reduced when an existing light detection apparatus detects a physiological feature information, resulting in that grains of collected physiological feature information are hard to distinguish, and the information collection is inaccurate.

An embodiment of the present disclosure provides a light detection apparatus. The light detection apparatus includes a nonopaque cover plate, a display, and a photosensor, and further including a processor configured to transmit a display driving signal to the display when the apparatus detects a touch signal on the apparatus. The display includes a plurality of display pixels configured to emit an optical signal when receiving the display driving signal transmitted by the processor, and the optical signal is reflected on an upper surface of the nonopaque cover plate to form a reflected optical signal. The reflected optical signal is received by the photosensor.

In some embodiment, the apparatus further includes an optical bandpass filter, and the optical bandpass filter is configured to transmit a light with an incident angle and a wavelength satisfying a bandpass condition and to filter other light that does not satisfy the bandpass condition.

In some embodiment, the optical bandpass filter is disposed between the display and the photosensor, and the reflected optical signal is transmitted through the optical band pass filter and then received by the photosensor.

In some embodiment, the touch signal is triggered by a part with physiological feature information touching the upper surface of the nonopaque cover plate.

In some embodiment, the display includes a plurality of display pixels, and the processor is configured to drive a single display pixel or a display pixel array on the display to emit the optical signal according to a preset timing sequence signal to form one or more point light sources for scanning the part with the physiological feature information.

In some embodiment, the processor is configured to perform a signal analysis on the reflected optical signal corresponding to the optical signal emitted by a plurality of groups of single display pixels or a plurality of groups of display pixel arrays, and to construct a physiological feature image of the part with the physiological feature information.

In some embodiment, the photosensor includes a plurality of light-sensitive pixel areas, and each light-sensitive pixel area includes a pixel circuit including a thin film transistor and a light-sensitive element.

In some embodiment, the optical bandpass filter includes an optical film formed of a plurality of layers of materials with different optical refractive indexes, or a device with a photonic crystal structure and a periodically changing refractive index.

In some embodiment, the optical signal is totally reflected on the upper surface of the nonopaque cover plate to form a totally reflected optical signal, and the totally reflected optical signal is received by the photosensor.

In some embodiment, the optical bandpass filter is configured to filter the reflected optical signal with a reflection angle less than a critical angle of a total reflection formed on the upper surface of the nonopaque cover plate.

In some embodiment, the display includes a self-light-emitting diode pixel array.

Another embodiment of the present disclosure provides a method for detecting and identifying a physiological feature using the light detection apparatus. The method includes: transmitting, by the processor, the display driving signal to the display when the apparatus detects the touch signal of a part with physiological feature information touching the apparatus; emitting, by the plurality of display pixels on the display, the optical signal when receiving the display driving signal transmitted by the processor, wherein the optical signal is reflected on the upper surface of the nonopaque cover plate to form the reflected optical signal; receiving, by the photosensor, the reflected optical signal; and identifying, by the processor, the physiological feature information of the part according to the reflected optical signal received by the photosensor.

In some embodiment, the method further includes: driving, by the processor, a single display pixel or a display pixel array on the display to emit the optical signal according to a preset timing sequence signal to form one or more point light sources for scanning the part with the physiological feature information.

In some embodiment, identifying, by the processor, the physiological feature information of the part according to the reflected optical signal received by the photosensor includes: performing a signal analysis, by the processor, on the reflected optical signal corresponding to the optical signal emitted by a plurality of groups of single display pixels or a plurality of groups of display pixel arrays, and constructing a physiological feature image.

In some embodiment, the physiological feature information has a ridge and valley texture.

In some embodiment, wherein the physiological feature information includes a fingerprint information or a palm print information.

Different from the conventional technology, the present disclosure provides a light detection apparatus and its application. The light detection apparatus can filter out reflected light within effective areas corresponding to each display pixel by an optical bandpass filter in the structure, and perform analysis on the optical signal in the effective areas corresponding to each display pixel by the processor, so as to construct and output a complete physiological feature identification image information. Since the reflected optical signal within the effective areas can best reflect the physiological feature information (such as a dark pattern and a bright pattern corresponding to ridges and valleys respectively), thus the constructed physiological feature image is more accurate, and the accuracy of the physiological feature identification is effectively improved. In addition, the optical bandpass filter greatly reduces the influence of ambient light and stray light in the screen, avoids sensor saturation and effectively improves data quality of physiological feature imaging.

DETAILED DESCRIPTION

Figure 1:
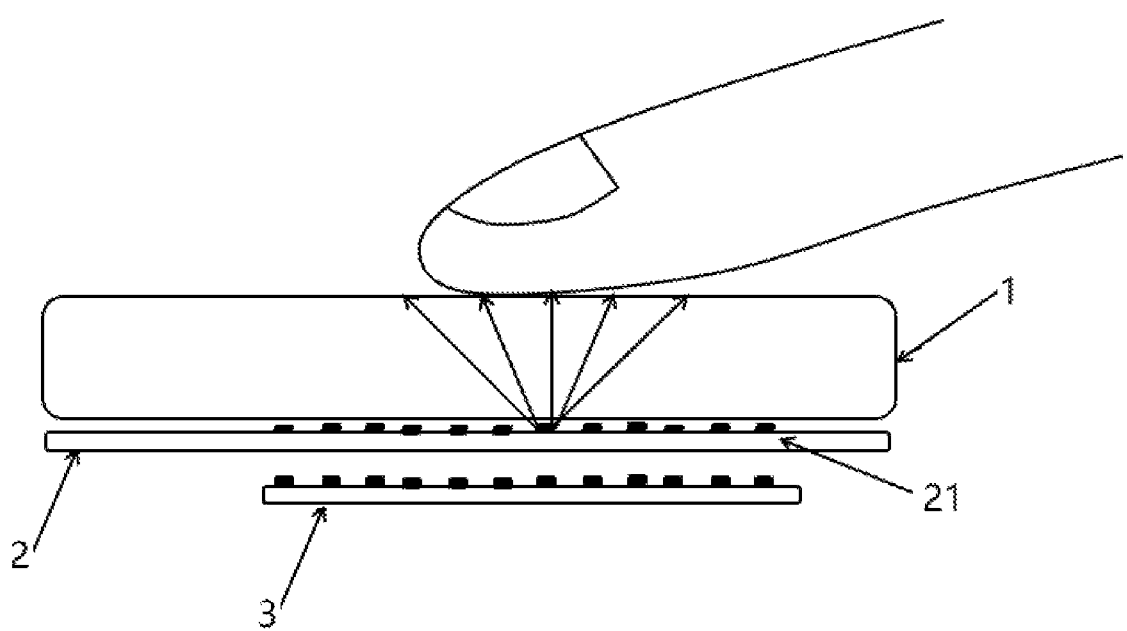
FIG. 1 is a structural schematic view of a conventional light detection apparatus.

In order to describe in detail technical contents, structural features, achieved objectives and effects of the present disclosure, following description will be given in conjunction with specific embodiments and accompanying drawings.

A semiconductor field effect transistor (FET) is a main structure performing TFT switching function. The well-known semiconductor layer materials include amorphous silicon, polycrystalline silicon, indium gallium zinc oxide (IGZO), or organic compounds mixed with carbon nanomaterials. Photodiode may be made of such semiconductor materials as well, whose manufacturing equipments are also compatible with manufacturing equipments of a TFT array. Therefore, a manufactured photodiode can be directly integrated with the TFT and the photodiode can be scanned and driven by the TFT. Recently, TFT photodiodes which are widely applied in X-ray sensing flat panel devices, are gradually manufactured by TFT array manufacturing process.

Compared with image sensor devices made of traditional crystalline materials, band gaps of above mentioned TFT photosensor materials correspond to visible light as the main absorption range, and thus are more susceptible to interference from ambient visible light to form noise, resulting in a low signal-to-noise ratio (SNR). Due to this limitation, a TFT light sensing array is initially mainly applied in X-ray sensing flat panel devices. X-ray has short wavelength and high collimation. An X-ray image is first incident on a light wavelength conversion material arranged on a sensing flat panel, which converts the X-ray image into visible light with a longer wavelength and then directly transmits to the TFT photosensor from inside of the sensing flat panel, avoiding noise interference caused by the visible light in the surrounding environment.

If such a well-known TFT visible photosensor is disposed in a structure of the display, it can be used as an implementation solution for integrating a light detection function into the display. However, due to factors such as a thickness of the display and an aperture of pixels, a real image sensed by a photo diode array has been distorted with diffraction. Further, an optical signal transmits through a multilayer structure of the display, and an optical display signal and a touch sensing signal coexist, it is very difficult to extract useful optical signals from a scene with a low signal-to-noise ratio, and the difficulty in technique is almost equivalent to single-photon imaging technology. Related algorithms based on light wave theory are needed to reconstruct to analyze original image. In order to avoid this technical difficulty, existing solution involves disposing a visible light sensor film in an original display structure, which will require an additional optical enhancement device, or disposing a light sensor film in a side of the display and using light reflected to the side non-vertically for optical image reconstruction. However, although the technical difficulty of weak light imaging is avoided, the additional optical device increases the thickness of the display, and the configuration on the side of the display cannot satisfy the user's full-screen experience.

FIG. 1 is a schematic view of a structure of a conventional light detection apparatus. The apparatus sequentially includes a nonopaque cover plate/touch screen 1, a light-emitting diode display 2. A photosensor 3 is disposed below the light-emitting diode display for detecting and identifying a physiological feature of a user. Taking fingerprint identification as an example, the structure shown in FIG. 1 has at least following problems when realizing fingerprint information collection: (1) when display pixels right below a finger irradiates the finger, different optical phenomena, such as light transmission, light reflection and light scattering, will occur on an upper surface of the nonopaque cover plate, thus an effective reflected optical signal that can really form bright and dark pattern corresponding to a ridge or a valley of a fingerprint is very weak, and thus it is even more difficult to distinguish the ridge or the valley of the fingerprint; (2) as limited by materials and related thicknesses of the nonopaque cover plate, the touch screen and the light-emitting diode display, even if the reflected optical signal is strong enough, when it passes through the nonopaque cover plate, the touch screen and the light-emitting diode display, and reaches the photosensor, light intensity has been severely reduced (usually reduced by more than 95%), and the reflected optical signal may also be optically distorted when passing through a TFT film of the display, which affects the collection of fingerprint information.

In order to resolve the above problems, a light detection apparatus is provided in the present disclosure. The light detection apparatus includes a nonopaque cover plate, a display, and a photosensor, and further includes a processor configured to transmit a display driving signal to the display when the apparatus detects a touch signal on the apparatus. The display includes a plurality of display pixels configured to emit an optical signal when receiving the display driving signal transmitted by the processor. The optical signal is reflected on an upper surface of the nonopaque cover plate to form a reflected optical signal; and the reflected optical signal is received by the photosensor.

Figure 2:
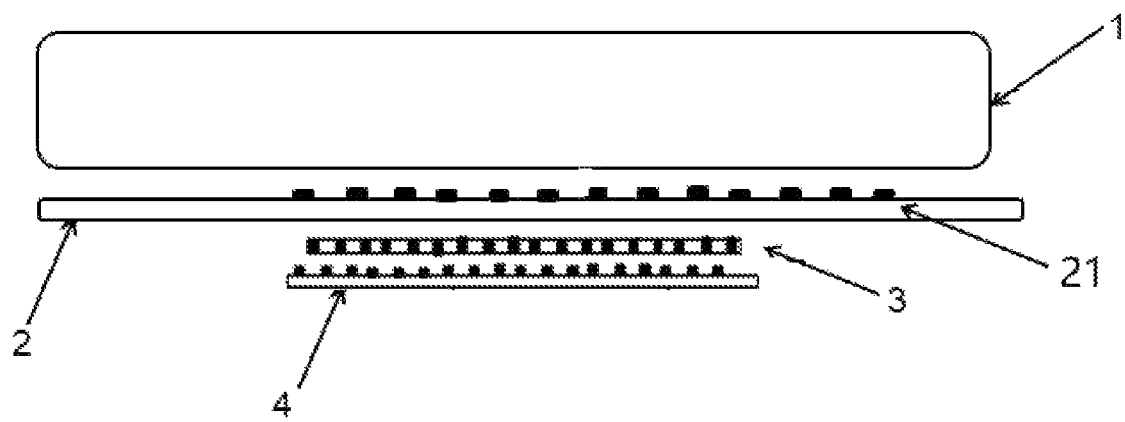
FIG. 2 is a structural schematic view of a light detection apparatus according to an embodiment of the present disclosure.

FIG. 2 is a structural schematic view of a light detection apparatus according to an embodiment of the present disclosure. The light detection apparatus can be applied to detect and identify a physiological feature information. The physiological feature information includes a physiological feature information with ridge-valley changing texture, such as a fingerprint, a palm print, etc. Some embodiments of the present disclosure take detecting and identifying a fingerprint information as an example to further explain application scenarios of the light detection apparatus of the present disclosure.

The light detection apparatus sequentially includes a nonopaque cover plate, a touch screen, a light-emitting diode display 2, an optical bandpass filter 3 and a photosensor 4 from top to bottom. Every two adjacent elements are closely attached to each other in an up-down direction. For the convenience of explanation, the nonopaque cover plate and the touch screen are simplified as an integrated piece in all drawings of the present disclosure, and recorded as the nonopaque cover plate/touch screen 1. When describing an optical path change below, a change of an optical path on a surface of the nonopaque cover plate/touch screen 1 is simplified as a change of the optical path on a surface of the nonopaque cover plate.

In some embodiments, the light detection apparatus also includes a processor (not shown in the figure). The processor may be disposed below the photosensor 4, and configured to transmit a display driving signal to the light-emitting diode display when the apparatus detects a touch signal on the apparatus.

The light-emitting diode display 2 includes a plurality of display pixels 21. The display pixels are configured to emit an optical signal when receiving the display driving signal transmitted by the processor, and the optical signal is reflected on an upper surface of the nonopaque cover plate to form a reflected optical signal. The touch signal may be triggered by a part with physiological feature information touching the upper surface of the nonopaque cover plate.

The reflected optical signal is transmitted through the optical band pass filter 3 and received by the photosensor.

The optical band pass filter 3 is configured to transmit a light with a specific incident angle and a specific wavelength, and filters other light that does not satisfy a bandpass condition.

The processor 5 is configured to generate and output a physiological feature identification image information according to the reflected optical signal received by the photosensor 4.

The photosensor 4 uses a single pixel or a plurality of pixels (which may be a row or a column of pixels, or a plurality of pixels arranged periodically or non-periodically) as a light source. After irradiating the fingerprint on the nonopaque cover plate, light may be reflected. Most of the light irradiated to a ridge of the fingerprint is absorbed by a skin of the ridge, and an air gap between a valley and the nonopaque cover plate can reflect all the light irradiated to the valley when a reflection angle is greater than a certain critical angle, so photosensitive pixels of the photosensor can receive different bright and dark features of ridges and valleys of the fingerprint, and the photosensor can construct an image of ridges and valleys of the fingerprint according to the bright and dark features shown by the reflected optical signal.

In some embodiment, the optical signal is totally reflected on the upper surface of the nonopaque cover plate 1 to form a totally reflected optical signal, and the totally reflected optical signal is received by the photosensor 4.

In some embodiment, the optical bandpass filter 3 is configured to filter the reflected optical signal with a reflection angle less than a critical angle of a total reflection formed on the upper surface of the nonopaque cover plate 1.

Figure 3:
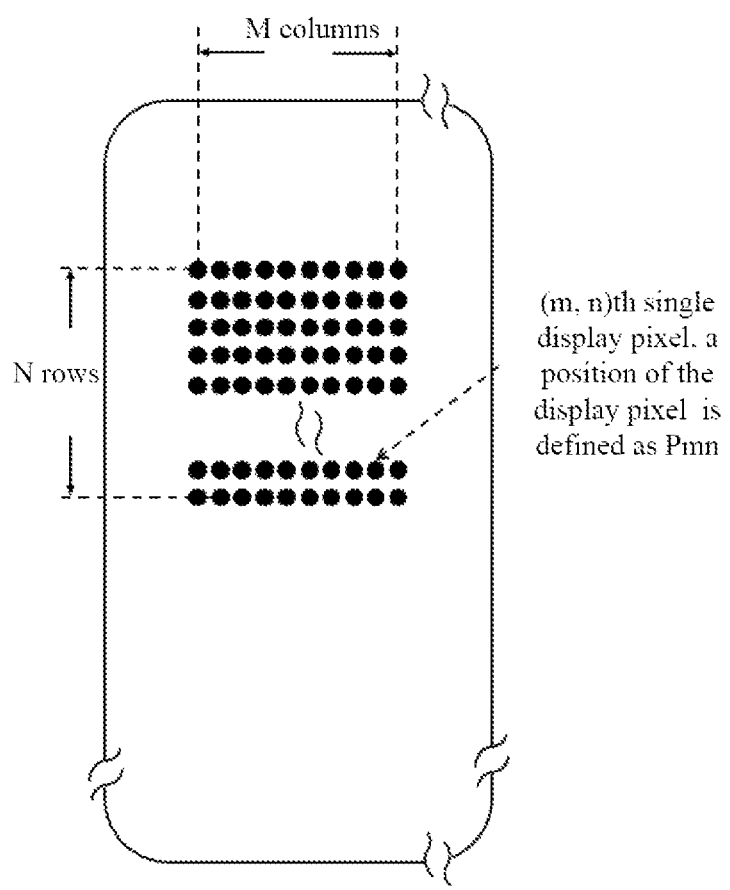
FIG. 3 is a schematic view of display pixels in a light-emitting diode display according to an embodiment of the present disclosure.

FIG. 3 is a schematic view of pixels in the light-emitting diode display according to an embodiment of the present disclosure. The light-emitting diode display, as the name suggests, is a display including a self-light-emitting diode pixel array, such as an organic light-emitting diode (OLED) display, a micro light-emitting diode display (micro-LED) and so on. The display includes M×N display pixels. In order to facilitate the detailed description of an optical path change of the optical signal emitted by each display pixel, the display pixel in the nth row and the mth column of the display is recorded as Pmn, and the optical path change of other display pixels can be obtained in the same way. In order to better describe the optical path change of the pixel, it is assumed that a thickness of the light-emitting diode display in the present disclosure is less than 1/10 of a thickness of the nonopaque cover plate, and refractive indexes of the display and the nonopaque cover plate are relatively close. Therefore, when calculating the optical path change, a change of the reflected optical signal on the surface of the display can be ignored as compared with the nonopaque cover plate, so as to simplify the description.

Figure 4:
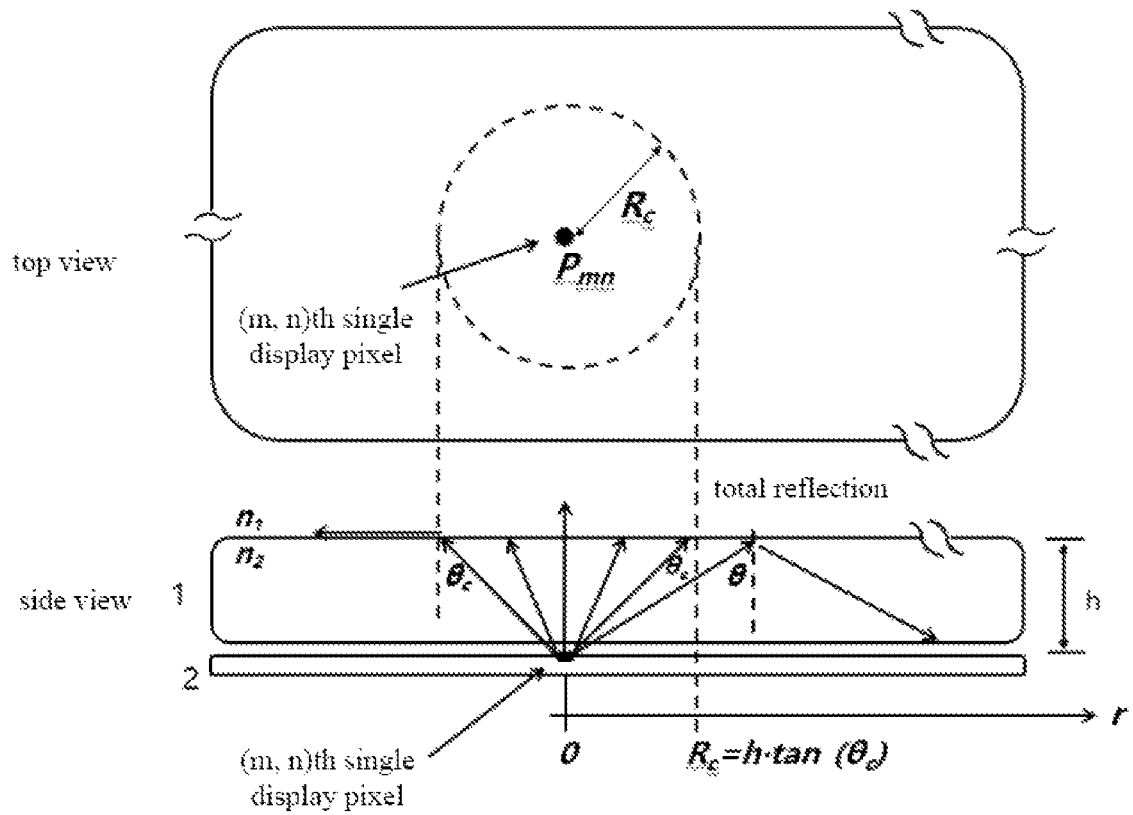
FIG. 4 is a schematic view showing an optical path change of a single display pixel according to an embodiment of the present disclosure.

FIG. 4 is a schematic view showing an optical path change of a single display pixel according to an embodiment of the present disclosure. A dashed circle represents a top view of a light beam emitted from a single display pixel Pmn and having a cross-sectional with a radius smaller than Rc. The light beam with the radius of Rc has an incident angle θc on the upper surface of the nonopaque cover plate, as shown in the position corresponding to a dashed line in FIG. 4.

Since a refractive index n2 of the nonopaque cover plate is about 1.5, and a refractive index n1 of the air is about 1.0, when the light source of the (m, n)th display pixel irradiates upward at a large angle, an incident angle θ on the surface of the nonopaque cover plate is greater than θc (θc=sin$^{-1}$(n1/n2)) will be totally reflected. Assuming that a projection length of θc corresponding to axis r of a circular coordinate is Rc, the light outside a dashed circle with the (m, n)th display pixel Pmn as the origin and Rc as the radius may be light rays totally reflected on the upper surface of the nonopaque cover plate. When the light rays having an incident angle greater than θc on the upper surface of the nonopaque cover plate irradiate the ridge of the fingerprint contacting the upper surface of the nonopaque cover plate, a refractive index of the skin of the ridge has destroyed original condition of total reflection, resulting in that the reflected signal corresponding to a position of the ridges in the fingerprint cannot be totally reflected on the nonopaque cover plate, so that most of the reflected optical signal cannot enter the photosensor through a lower surface of the nonopaque cover plate to form a dark pattern. On the other hand, because there is an air gap between the valleys of the fingerprint and the nonopaque cover plate, the reflected optical signal corresponding to positions of the valleys maintains a total reflection, and thus can reach the photosensor to form a bright pattern.

In short, compared with the light within the dashed circle in FIG. 4, the light having an incident angle greater than θc on the upper surface of the nonopaque cover plate can be more effectively used to detect valleys in the fingerprint. Therefore, an effective fingerprint identification technology under or in a display takes Rc as a feature size, and uses a combination of display pixels to emit light and scan a finger part on the nonopaque cover plate to use a highly sensitive reflective area to obtain a fingerprint image. Assuming that the thickness of the nonopaque cover plate is h, then Rc=h·tan(θc).

For the single pixel if its emitting light beam that can be totally reflected on the upper surface of the nonopaque cover plate, the optical signal of the signal pixel can capture the fingerprint information with higher precision. Based on this, it can be defined that when under-screen or in-screen fingerprint identification technology is implemented, after the (m, n)th display pixel of the light-emitting diode display is used as the light source to illuminate the fingerprint, a relatively sensitive and effective fingerprint area collected by the photosensor is an area of the light beams outside a dashed concentric circular ring with the (m, n)th display pixel Pmn as the origin and Rc as the radius, that is, an area range of Rc<r by projecting in the direction of axis r of the circular coordinate, where the photosensor can obtain a most suitable fingerprint optical information from the light source emitted by the single display pixel of the light-emitting diode display.

For reflected light in an area of r<Rc, the present disclosure provides the optical bandpass filter 3 for filtering the reflected light above the photosensor 4. In some embodiment, the optical bandpass filter may include an optical film formed of a plurality of layers of materials with different optical refractive indexes, or a device with a photonic crystal structure and a periodically changing refractive index.

The optical bandpass filter can selectively transmit light with a suitable wavelength and reflect light with other wavelengths. The present disclosure utilizes a definite dependence characteristic of the wavelength and incident angle of the light transmitting through the optical bandpass filter, and reflect (filter) the reflected light in the area of r<Rc, as well as most of ambient light and stray light in the screen through an accurate design of the wavelength and angle of the light transmitting through the optical bandpass filter. At the same time, the present disclosure enables the light carrying the fingerprint information to transmit through at a higher proportion, so as to improve a signal-to-noise ratio of fingerprint imaging.

Figure 5:
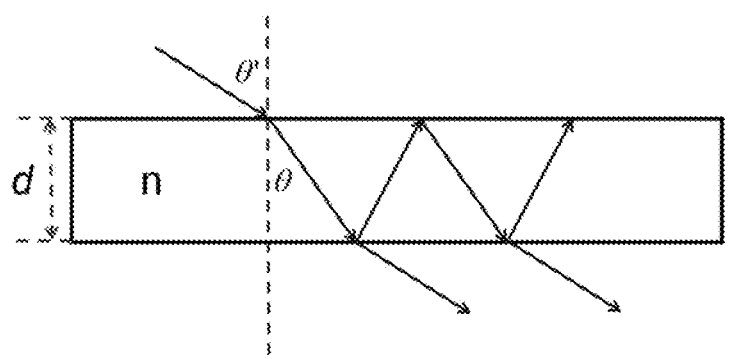
FIG. 5 is a schematic view showing an optical path change of a single display pixel entering an optical bandpass filter according to an embodiment of the present disclosure.

FIG. 5 is a schematic view showing an optical path change of the single display pixel entering the optical bandpass filter according to an embodiment of the present disclosure. The optical path of the pixel is reflected multiple times inside the optical bandpass filter. The light reflected each time at a point has a fixed phase difference relative to the light incident at that time at the same point, resulting in optical interference. On the other side of the optical bandpass filter, according to the principle of interference, the condition that an light intensity of the outgoing light beams reaches a peak value (constructive interference) can be calculated:

$$\lambda = nd \cos \theta;$$

wherein λ and θ represent the wavelength of the incident light and an exit angle (a function of the incident angle θ' of the light) of an incident interface of the optical bandpass filter, n represents the refractive index of the optical bandpass filter, and d represents a thickness of the optical bandpass filter.

It can be seen from above formula that since the refractive index n of the optical bandpass filter and the thickness d of the optical bandpass filter will not change significantly in practical applications, there is a one-to-one quantitative corresponding relationship between the incident (passing light) wavelength λ and the incident (passing light) angle θ'. Assuming a wavelength λ of the light that can transmit through the optical bandpass filter is 630 nm when the incident angle θ' is 0 nm, because the wavelength A of the stray light in the screen is also 630 nm, while the incident angle θ' is not 0, it can be reflected and thus cannot be transmitted through the optical bandpass filter. For the ambient light, only those whose wavelength and incident angle satisfy the above formula can be transmitted through, and most of them are reflected.

Figure 6:
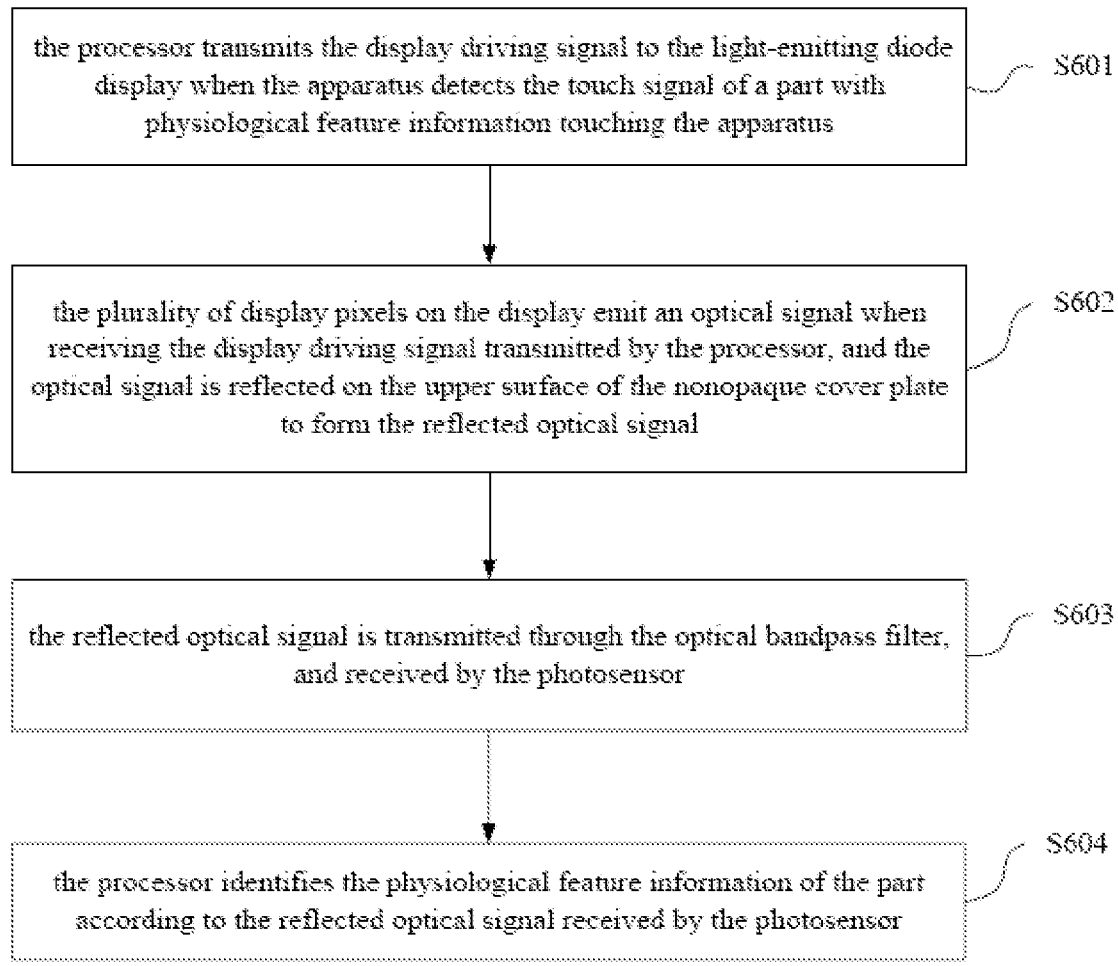
FIG. 6 is a flowchart of a method for detecting and identifying a physiological feature according to an embodiment of the present disclosure.

The present disclosure also provides a method for detecting and identifying a physiological feature. The method may be applied to the light detection apparatus of the present disclosure. FIG. 6 shows a flowchart of the method.

In S601, the processor transmits the display driving signal to the light-emitting diode display when the apparatus detects the touch signal of a part with physiological feature information touching the apparatus. Taking a fingerprint information identification as an example, when the processor detects that a user's finger is placed on the upper surface of the nonopaque cover plate, the touch signal is triggered.

In S602, the plurality of display pixels on the display emit an optical signal when receiving the display driving signal transmitted by the processor. The optical signal is reflected on the upper surface of the nonopaque cover plate to form the reflected optical signal. Because the display and the nonopaque cover plate have a certain degree of light transmittance or are nonopaque, the optical signal emitted by the pixels will not only be reflected on the upper surface of the nonopaque cover plate, but is transmitted, that is, entering the air directly through the upper surface of the nonopaque cover plate. Only the optical signal reflected on the upper surface of the nonopaque cover plate will finally enter the photosensor to form a corresponding signal light carrying fingerprint information. In some embodiments, the method in the present disclosure further includes filtering and/or processing the reflected optical signal.

In S603, the reflected optical signal is transmitted through the optical bandpass filter, and received by the photosensor. The optical bandpass filter can transmit light with the specific incident angle and the specific wavelength satisfying the bandpass condition and filter other light that does not satisfy the bandpass condition.

In S604, the processor identifies the physiological feature information of the part according to the reflected optical signal received by the photosensor. The processor drives the single display pixel or the display pixel array on the display to emit the optical signal according to a preset timing sequence signal to form one or more light point sources for scanning the part with the physiological feature information on the upper surface of the nonopaque cover plate to form the reflected optical signal. Then, the processor performs a signal analysis on the reflected optical signal corresponding to the optical signal emitted by a plurality of groups of single display pixels or a plurality of groups of display pixel arrays, and to construct a complete physiological feature image information of the part with the physiological feature information.

In some embodiments, the display includes M×N pixels, and the method includes that the processor sequentially drives the single display pixel or the display pixel array on the display to emit optical signals according to the preset timing sequence signal to form the one or more light point sources for scanning the part with the physiological feature information to form the reflected optical signal. For example, the first row of pixels on the display is $P_{11}$, $P_{12} \ldots P_{1N}$, the second row is $P_{21}$, $P_{22} \ldots P_{2N}$, and so on, the Mth row is $P_{M1}$, $P_{M2} \ldots P_{MN}$. By preset timing sequence electrical signal, the processor can drive the display pixels on the display row by row and column by column, or drive discrete display pixels that change periodically (for example, firstly driving the first row $P_{11}$, $P_{13}$, $P_{15}$, and then driving the second row $P_{21}$, $P_{23}$, $P_{25}$, and then driving the third row $P_{31}$, $P_{33}$, $P_{35}$, and so on). Certainly, it is also possible to sequentially drive a plurality of display pixels arranged in a non-periodically changing arrangement or a random arrangement in their spatial positions. In short, the sequence of driving each pixel on the display to emit light may be various and selected according to actual needs.

In some embodiments, the photosensor includes a plurality of light-sensitive pixel areas, and each light-sensitive pixel area includes a pixel detection structure. Each pixel detection structure includes a pixel circuit, and the pixel circuit includes a thin film transistor and a light-sensitive element. In some embodiment, the light-sensitive element includes a photosensitive diode or a photosensitive transistor.

It should be noted that although the present disclosure has disclosed above embodiments, the protection scope of the present disclosure is not limited thereto. Therefore, based on innovative concept of the present disclosure, changes and modifications to the embodiments described herein, or equivalent structure or equivalent process transformation of the description and attached drawings of the present disclosure, or direct application or indirect application of above technical solutions in other related technical fields are all included in the protection scope of the present disclosure.

The invention claimed is:

1. A light detection apparatus, comprising a nonopaque cover plate, a display, and a photosensor, and further comprising a processor configured to transmit a display driving signal to the display when the apparatus detects a touch signal on the apparatus;
   wherein the display comprises a plurality of display pixels configured to emit an optical signal when receiving the display driving signal transmitted by the processor, and the optical signal is reflected on an upper surface of the nonopaque cover plate to form a reflected optical signal; and
   wherein the reflected optical signal is received by the photosensor;
   wherein the light detection apparatus further comprises an optical bandpass filter,
   wherein the optical bandpass filter is configured to transmit a light with an incident angle and a wavelength satisfying a bandpass condition and to filter other light that does not satisfy the bandpass condition,
   when r≥Rc, the optical signal is totally reflected on the upper surface of the nonopaque cover plate to form a totally reflected optical signal, and the totally reflected optical signal is transmitted through the optical bandpass filter and then received by the photosensor; and
   when r<Rc, the optical signal is reflected on the upper surface of the nonopaque cover plate to form the reflected optical signal, and the reflected optical signal is filtered by the optical bandpass filter;
   wherein r is a projection radius of the optical signal emitted by the plurality of display pixels on a surface of the nonopaque cover plate, and Rc is a projection radius of the optical signal having an incident angle equal to a critical angle of a total reflection emitted by the plurality of display pixels on the surface of the nonopaque cover plate.

2. The light detection apparatus according to claim 1, wherein the touch signal is triggered by a part with physiological feature information touching the upper surface of the nonopaque cover plate.

3. The light detection apparatus according to claim 2, wherein the display comprises a plurality of display pixels, and the processor is configured to drive a single display pixel or a display pixel array on the display to emit the optical signal according to a preset timing sequence signal to form one or more point light sources for scanning the part with the physiological feature information.

4. The light detection apparatus according to claim 2, wherein the processor is configured to perform a signal analysis on the reflected optical signal corresponding to the optical signal emitted by a plurality of groups of single display pixels or a plurality of groups of display pixel arrays, and to construct a physiological feature image of the part with the physiological feature information.

5. The light detection apparatus according to claim 1, wherein the photosensor comprises a plurality of light-sensitive pixel areas, and each light-sensitive pixel area comprises a pixel circuit comprising a thin film transistor and a light-sensitive element.

6. The light detection apparatus according to claim 1, wherein the optical bandpass filter comprises an optical film formed of a plurality of layers of materials with different optical refractive indexes, or a device with a photonic crystal structure and a periodically changing refractive index.

7. The light detection apparatus according to claim 1, wherein the optical bandpass filter is configured to filter the reflected optical signal with a reflection angle less than a critical angle of a total reflection formed on the upper surface of the nonopaque cover plate.

8. The light detection apparatus according to claim 1, wherein the display comprises a self-light-emitting diode pixel array.

9. A method for detecting and identifying a physiological feature, using the light detection apparatus according to claim 1, comprising:
   transmitting, by the processor, the display driving signal to the display when the apparatus detects the touch signal of a part with physiological feature information touching the apparatus;
   emitting, by the plurality of display pixels on the display, the optical signal when receiving the display driving signal transmitted by the processor, wherein the optical signal is reflected on the upper surface of the nonopaque cover plate to form the reflected optical signal,
   transmitting a light with an incident angle and a wavelength satisfying a bandpass condition and filtering other light that does not satisfy the bandpass condition by the optical bandpass filter;
   receiving, by the photosensor, the reflected optical signal; and
   identifying, by the processor, the physiological feature information of the part according to the reflected optical signal received by the photosensor;

when r≥Rc, the optical signal is totally reflected on the upper surface of the nonopaque cover plate to form a totally reflected optical signal, and the totally reflected optical signal is transmitted through the optical bandpass filter and then received by the photosensor; and when r<Rc, the optical signal is reflected on the upper surface of the nonopaque cover plate to form the reflected optical signal, and the reflected optical signal is filtered by the optical bandpass filter;

wherein r is a projection radius of the optical signal emitted by the plurality of display pixels on a surface of the nonopaque cover plate, and Rc is a projection radius of the optical signal having an incident angle equal to a critical angle of a total reflection emitted by the plurality of display pixels on the surface of the nonopaque cover plate.

10. The method according to claim 9, further comprising:
driving, by the processor, a single display pixel or a display pixel array on the display to emit the optical signal according to a preset timing sequence signal to form one or more point light sources for scanning the part with the physiological feature information.

11. The method according to claim 9, wherein identifying, by the processor, the physiological feature information of the part according to the reflected optical signal received by the photosensor comprises:
performing a signal analysis, by the processor, on the reflected optical signal corresponding to the optical signal emitted by a plurality of groups of single display pixels or a plurality of groups of display pixel arrays, and constructing a physiological feature image.

12. The method according to claim 9, wherein the physiological feature information has a ridge and valley texture.

13. The method according to claim 9, wherein the physiological feature information comprises a fingerprint information or a palm print information.

* * * * *